Patented Jan. 13, 1953

2,625,524

UNITED STATES PATENT OFFICE 2,625,524

VISCOUS UREA-FORMALDEHYDE COMPOSITIONS AND METHOD FOR PREPARING THE SAME

Hamline Monroe Kvalnes, Wilmington, Del., assignor to E. I. du Pont de Nemours and Company, Wilmington, Del., a corporation of Delaware No Drawing. Application December 26, 1951, Serial No. 263,520

4 Claims. (Cl. 260—29.4)

This invention relates to viscous urea-formaldehyde compositions and to processes for preparing viscous compositions from mixtures of higher methylol ureas and urea. This application is a continuation-in-part of my copending application S. N. 175,470, filed July 22, 1950, now abandoned. The latter application is a continuation-in-part of my application S. N. 750,167, filed May 23, 1947, now abandoned, which in turn is a continuation-in-part of my application S. N. 732,927, now U. S. Reissue Patent 23,174.

A significant recent advance in the urea-formaldehyde resin art has been the discovery of clear, liquid polymethylol urea compositions containing controlled amounts of free formaldehyde; these compositions are obtainable by reaction between urea and monomeric formaldehyde which is kept substantially free of polymerized formaldehyde molecules by maintaining the formaldehyde temperature above about 45° C. from the time that the said formaldehyde is produced until the time it is converted to polymethylol urea. The clear, liquid, permanently stable, unpolymerized urea-formaldehyde compositions thus obtained are high in content of resin-forming ingredients and are suitable for shipment in commercial tank car equipment. When mixed with urea, these liquid products are widely useful in the manufacture of impregnated wood, impregnated paper, lacquers, finished textiles, etc., as disclosed in my Reissue Patent 23,174.

For certain specific uses, partially polymerized urea-formaldehyde resin intermediates are more effective than the corresponding monomeric methylol ureas. This is especially true in the adhesive art, in making solid foams, as a bonding resin in sawdust board, and also to a limited extent in the manufacture of certain finished textiles, particularly chintz. Because of the outstanding properties of the liquid compositions hereinabove mentioned, especially from the standpoint of suitability for storage and shipment, and because of the fact that for the above-mentioned specific applications a "bodied" or partially polymerized urea-formaldehyde is desired, a need had arisen for a method for converting the above-mentioned liquid compositions to partially polymerized compositions having viscosities within the range suitable for such applications. It is also necessary that such "bodied" compositions be sufficiently stable to permit practical utilization thereof.

An object of this invention is to prepare, from a clear, liquid, stable methylol urea liquid composition, a partially polymerized viscous, liquid, stable urea-formaldehyde composition, suitable for use as an adhesive or in similar applications. Other objects of the invention appear hereinafter.

The aforesaid objects are accomplished in accordance with this invention by providing a process for preparing a urea-formaldehyde partially polymerized liquid composition which comprises adding urea to a clear, liquid, aqueous polymethylol urea composition having a total free and combined formaldehyde : urea mol ratio (hereinafter called F/U) of 3.5:1 to 8:1, preferably 4:1 to 6:1, a ratio of combined to free formaldehyde within the range of 1:1 to 3:1 (when the F/U ratio is 4:1 to 6:1), and a urea-formaldehyde content, including the free and combined urea and formaldehyde, in the range of 60% to 75% by weight, at a pH of 3.0 to 9.5, until the total free and combined F/U mol ratio is in the range of 1.8:1 to 3:1, maintaining the resulting mixture at the said pH at a temperature of 25° to 110° C., said temperature being however not in excess of 80° C. when the pH is below 5.0, until the free formaldehyde concentration closely approaches, or reaches, a constant, equilibrium value, as defined hereinafter in greater detail, thereafter heating the mixture at a pH in the range of 3.0 to 6.9 at a temperature in the range of 60° to 110° C., said temperature being however not less than 90° C. when the pH is within the range of 6.5 to 6.9, until its viscosity is within the range of 40 to 3600 centipoises. If the resulting mixture is to be stored before usage, the pH should preferably be adjusted to a value within the range of 7.0 to 9.0; if the mixture is to be used within a week, it is not necessary to adjust the pH. Moreover, at a pH as low as 6.0, storage for about one month is possible.

The ratio of combined formaldehyde to free formaldehyde in the stable, clear, polymethylol urea solutions used in the process of this invention is generally between 1.0 and 1.8 when the F/U mol ratio is 6:1, while at a F/U ratio of 4:1 the ratio of combined formaldehyde to free formaldehyde is usually between 1.8 and 3.0.

While it is generally desirable in the manufacture of impregnating compositions to employ monomeric methylol ureas (or mixtures of urea and formaldehyde) in which the F/U ratio is relatively low, i. e., about 1.3, a higher F/U ratio is preferred in "bodied" compositions to be used in the manufacture of adhesives. The compositions of relatively low F/U ratio are generally not suitable for use in the manufacture of stable, viscous compositions, since the shelf life of the viscous materials increases with an increase in F/U ratio. As a rule, the viscous compositions increase in viscosity on storage until, after several months at room temperature, gelation sets in. When the F/U ratio is below 1.8:1, the mixtures become thixotropic in a few days to several weeks. The preferred viscous compositions, having a somewhat higher F/U ratio, on the other hand, may be stored for about six months or more. Commercial practice apparently requires that such materials remain useful for a period of at least about two to four months. When the F/U ratio is relatively high, i. e., about 3, the viscous compositions are permanently stable, but these high ratios are generally above the maximum required for maximum bond strength when the materials are employed as adhesives. The preferred range of F/U ratio for the "bodied" compositions is thus within the range of 1.8 to 3.0. The optimum range for the manufacture of cloudy products of the highest quality, while still having a shelf life within the acceptable range, is about 1.8:1 to 2:1.

The pH of the reaction mixture during the adjustment of the F/U ratio should be such that extremes of acidity or alkalinity are avoided. A suitable range of pH is about 3.0 to 9.5. If, during this stage of the process, the pH is kept within the range of about 7 to 9, polymerization of methylol ureas does not take place rapidly. Moreover, the range of temperatures which may be employed under such conditions is remarkably wide: for example, an experiment was made in which the temperature was increased to as high as 400° C. while maintaining the pH of the polymethylol urea solution at 7.0 to 9.0, the reaction vessel being a pressure-resistant autoclave. It was discovered that formaldehyde could be withdrawn from the gas phase without polymerization of the liquid composition, and that this withdrawal of formaldehyde could be continued until the resulting mixture was an aqueous mixture containing no urea-formaldehyde and no free formaldehyde.

While this result shows that the liquid polymethylol urea compositions do not polymerize rapidly at elevated temperatures when the pH is carefully controlled and maintained within the range of 7.0 to 9.0, it is generally preferable (although not essential) to control the temperature during the adjustment of the F/U ratio in the practice of this invention so that it does not exceed about 110° C. The reason for this is that at temperatures above 110° C., a relatively high pressure must be employed to keep the formaldehyde from escaping, and since the reaction takes place very rapidly, even at temperatures below 110° C. there appears to be no valid reason for employing conditions which would require precautions to prevent escape of formaldehyde. A sufficiently rapid reaction between the urea and the uncombined formaldehyde takes place at a temperature as low as about 25° C.

While temperature control is of relatively minor importance when the pH is within the range of 7.0 to 9.0, it is of major importance when the pH is on the acid side and especially when the pH is below 5, i. e., within the range of 3.0 to 5.0. Indeed it is essential that the temperature be kept below 80° C. when the pH is within the range of 3.0 to 5.0. Otherwise resinification takes place very rapidly and viscous liquid compositions are not obtained.

The reaction between the added urea and uncombined formaldehyde is generally permitted to take place until an equilibrium is approached or reached. This can be followed analytically, and the reaction can thus be continued until the concentration of free formaldehyde becomes constant. This occurs when the free formaldehyde content falls below 3% of the weight of the composition, when the F/U ratio is 1.8 to 2.0. The equilibrium value is somewhat higher when the F/U ratio is 2.1 to 2.3. An excellent method of operation, if a very stable bodied intermediate is desired, is to body the mixture at F/U 2.3 and thereafter to increase the F/U ratio to 3 by addition of "Arboneeld" B (defined hereinafter).

After the adjustment of the F/U ratio, and the reaction between the added urea and the free formaldehyde as above described, the mixture is heated under acidic conditions until the desired viscosity is reached. During this "bodying" step, the temperature must be kept sufficiently high to prevent the formation of a thixotropic mixture. In general, the temperature should be within the range of 80° to 110° C. However, the temperature must be controlled even more narrowly than this if the pH is not below 6.5. The control of the temperature and pH during the "bodying" step is highly critical. For example, at a pH of 6.5 a temperature of 80° cannot be employed because this gives rise to a thixotropic composition. At a pH of 6.0 and a temperature of 80° C., the "bodying" reaction takes place satisfactorily. On the other hand, when the pH is below 5, the polymerization is too rapid to permit proper control unless the temperature is below 110° and preferably below about 85° C. In general, the preferred range is about 80° to 110° C., provided that precautions are taken to keep the temperature above 90° C. when the pH is within the range of 6.5 to 6.9. The "bodying" reaction is continued until the viscosity is at least about 40 centipoises (25° C.). If desired, the reaction can be continued until the viscosity is so high that gelation is imminent. The danger in permitting the reaction to proceed until the viscosity is so high that gelation soon occurs is that the increase in viscosity, as the gelation time is approached, is quite rapid and the reaction is therefore somewhat more difficult to control. Therefore, it is desirable to stop the reaction when the viscosity is somewhat lower than that which indicates imminent gelation; a suitable upper limit is about 3600 centipoises (25° C.).

The rate at which the polymerization takes place depends not only upon the temperature and pH but also upon the F/U ratio, as illustrated hereinafter in greater detail.

When the desired viscosity is attained, as above described, the pH may be adjusted to about 7.0 to 9.0 to produce maximum stability, after which the viscous mixture is cooled to storage temperature. This "freezes" the free formaldehyde content, which in these viscous products is preferably about 2 to 6% by weight, when the F/U ratio is about 2.2 to 2.5.

In the various steps described above, control of the pH can be accomplished by any of the known means for producing a hydrogen-ion concentration within the desired range. Sufficient quantities of phosphoric acid and/or sodium hydroxide may be employed if desired. Any other buffer mixture which produces the desired pH may be employed; for example, mixtures of sodium hydroxide and boric acid or other similar buffer mixtures give substantially the same results as are obtained with the phosphoric acid-sodium hydroxide buffer.

The maximum "solids content" of the compositions of this invention ("solids content" meaning free and combined urea and HCHO) depends upon the formaldehyde and water content of the aqueous formaldehyde employed in making the initial polymethylol urea solution. Monomeric formaldehyde obtained by the oxidation of methanol contains about 50% to 70% by weight of formaldehyde. The polymethylol urea liquid composition obtained from crystal urea and this monomeric formaldehyde is most economically employed in the practice of this invention, and accordingly the "solids content" of the compositions obtained in the practice of this invention is generally in the range of about 60% to 75%.

A typical polymethylol urea liquid composition which gives excellent results as a starting material in preparing the compositions of this invention contains the following ingredients:

Formaldehyde (free and combined)
per cent__ 46.5
Urea (free and combined)_____do____ 18.5
Ratio of combined to free formaldehyde___ 1.5
Total UF solids_____per cent__ 65
Water _____do____ 35
F/U ratio (total formaldehyde/total urea)_ 5
Specific gravity_____ 1.230–1.260
pH _____ 6.8–8.5

When urea is added to 1000 grams of this material (hereinafter referred to as "Arboneeld" B) the "solids content" is affected as follows:

| Weight urea | F/U ratio | UF solids content |
| --- | --- | --- |
| 331 grams | 1.8 | 73.7 |
| 280 grams | 2.0 | 72.6 |
| 238 grams | 2.2 | 71.6 |
| 185 grams | 2.5 | 70.5 |
| 125 grams | 3.0 | 68.9 |

It is to be understood however that once the viscous compositions have been obtained they can be diluted with water if a composition of lower solids content is desired. However, when this is done, the viscosity of the composition is very markedly decreased as shown in the following table. The table shows the effect of diluting various "bodied" compositions obtained in the practice of this invention, with water from a solids content of 70% by weight to a solids content of 50% by weight. This decrease in viscosity is not characteristic of any particular F/U ratio, but is observed over a rather wide range of F/U ratios.

*Effect of concentration on viscosities of "bodied" liquid urea-formaldehyde products*

| 70% solids | 50% solids |
| --- | --- |
| Centipoises | Centipoises |
| 75 | 20 |
| 125 | 30 |
| 200 | 40 |
| 500 | 60 |
| 1,000 | 90 |
| 1,500 | 110 |
| 3,500 | 150 |

In some instances, it is highly desirable to dilute the "bodied" compositions in order to extend their storage life. For example, the composition having a viscosity of 3500 centipoises at a solids content of 70% by weight has a life span of about a month at room temperature; however, by diluting the mixture until the viscosity is 150 centipoises the life is so greatly extended that the composition increases in viscosity to only about 175 centipoises in three months.

One of the most important embodiments of the present invention resides in the production, from "Arboneeld" B and urea, of viscous "clears" having maximum solids content (F/U ratios of 2.2 to 2.5). The specific conditions for making such "clears" from "Arboneeld" B and urea depend upon (1) F/U ratio, (2) free formaldehyde content at the end of the methylol-forming step, i. e. the methylolation of the added urea, (3) pH of the bodying step, and (4) temperature of the bodying step. A significant observation is the discovery that the free formaldehyde content, after adjustment of the F/U ratio to as low as 2.2, must be controlled at a level which depends upon the bodying temperature. This is done by continuing the methylolation step only until the desired stage is reached, in accord with the data given below. At F/U ratios below 2.2, viscous "clears" are rarely obtainable, although at F/U ratios of 2.0 to 2.1, with very careful control as shown in Example 3 hereinbelow, clears are sometimes produced. There is, on the other hand, no such difficulty in obtaining "clears" from "Arboneeld" B and urea at F/U ratios above 2.5; in fact, it is difficult to prepare opaque viscous compositions from "Arboneeld" B and urea at F/U ratios above 2.5. As shown in the following table the content of free formaldehyde at F/U 2.2–2.3, required for making "clears" is 4 to 5% when the bodying temperature is 95° C. At 85° C., "clears" are not thus produced at this low F/U ratio, as shown in the table.

The clarity of the bodied "Arboneeld" B-urea depends also on how far the "bodying" has been permitted to proceed.

In addition to the foregoing procedures for controlling the clarity of the bodied compositions, it has been found that products of the same composition can be made by starting with relatively pure dimethylolurea. This is accomplished by mixing dimethylolurea at pH of 7 to 9 with monomeric formaldehyde and water in such proportions that the F/U ratio is 5 and the U–F content is 65%. This mixture can then be heated at 60°–70° C. until the content of free formaldehyde is the same as in "Arboneeld" B. The resulting clear stable compositions can be converted to viscous "clears" by admixing with urea and carrying out the methylolation and bodying steps in the manner hereinabove just described for "Arboneeld" B-urea.

*Table I.—Effect of methylolation conditions bodying temperature on clarity of product from "Arboneeld" B-urea at maximum solids content, F/U–2.2–2.3*

[In these experiments the "Arboneeld" B-urea methylolation product was made by adding urea to "Arboneeld" B and heating the resulting mixture under the specified conditions until the free formaldehyde content falls to 4.1–5.61%, as shown. The pH is then lowered as shown in the table, and the bodying step is performed]

| F/U mol ratio | Resin solids, percent | Temp. urea added,[1] °C. | Methylol-forming step | | | | Bodying conditions | | | Product [4] | |
|---|---|---|---|---|---|---|---|---|---|---|---|
| | | | Temp. range, °C. | Time,[2] mins. | pH range | Final free HCHO, percent | Temp. range, °C. | Time,[3] mins. | pH range | Viscosity, cp., 25° C. | Appearance |
| 2.3 | 71 | 50 | 65–70 | 9  | 7.4 –8.3  | 6.06 | 83–83 | 60 | 4.6 –4.9   | 435 | Opaque. |
| 2.3 | 71 | 49 | 65–69 | 22 | 7.3 –8.1  | 5.08 | 83–86 | 70 | 4.65–4.75  | 475 | Clear. |
| 2.3 | 71 | 50 | 65–68 | 32 | 7.4 –8.0  | 4.30 | 85    | 52 | 4.60       | 285 | Do. |
| 2.3 | 71 | 50 | 65–70 | 42 | 7.1 –8.2  | 4.12 | 84–85 | 49 | 4.70       | 290 | Do. |
| 2.3 | 70 | 50 | 65–73 | 20 | 8.28–9.00 | 4.01 | 84–85 | 42 | 4.70–4.75  | 225 | Opaque. |
| 2.3 | 70 | 50 | 65–70 | 71 | 7.30–8.35 | 3.76 | 85–86 | 53 | 4.55–4.82  | 245 | Do. |
| 2.3 | 71 | 50 | 65–68 | 18 | 5.20–5.30 | 4.79 | 85    | 75 | 4.70–4.75  | 630 | Do. |
| 2.2 | 71 | 34 | 60–66 | 18 | 7.40–7.80 | 4.79 | 80–85 | 56 | 5.00       | 340 | Do. |
| 2.2 | 71 | 55 | 55–56 | 76 | 7.75–8.05 | 4.53 | 90–96 | 76 | 5.10–5.25  | 240 | Clear. |
| 2.2 | 71 | 50 | 60–66 | 22 | 7.30–7.90 | 4.14 | 80–86 | 33 | 4.85–4.90  | 370 | Opaque. |
| 2.3 | 71 | 45 | 34–46 | 20 | 8.70–8.80 | 5.60 | 70–93 | 60 | 4.90–5.30  | 320 | Do. |
| 2.3 | 71 | 32 | 65–66 | 20 | 7.50–8.00 | 5.61 | 92–95 | 40 | 4.95–5.20  | 130 | Clear. |
| 2.3 | 71 | 30 | 65–66 | 20 | 7.60–7.90 | 4.79 | 90–96 | 60 | 5.00–5.10  | 135 | Do. |

[1] Total urea plus free and combined HCHO.
[2] Time at the reaction temperature shown in the preceding column. After adding the urea the charge was heated rapidly to the reaction temperature of the methylol-forming step.
[3] Time at the bodying temperature shown in the preceding column. After the methylol-forming step was completed the pH of the charge was adjusted to the range shown for the bodying step and the charge was heated rapidly to the bodying temperature.
[4] The products listed as clear have remained clear on storage at 25° C. at pH of 7–9. The age of the products varies from three to sixteen weeks. When "clears" are unstable a precipitate usually forms within one week.

The invention is illustrated further by means of the following examples.

EXAMPLE 1

*Typical procedure to body "Arboneeld" B-urea compositions using intermittent pH control*

One thousand grams of "Arboneeld" B, a liquid urea-formaldehyde composition (46.5% total formaldehyde, 18.5% urea and 35% water; viscosity 22 centipoises at 25° C.; pH, ca. 7) is added to a 2-liter, 4-neck flask fitted with condenser, stirrer and thermometer. The pH is adjusted to 8.0 using 4% sodium hydroxide. To the resulting mixture is added 185 grams of urea to form a solution containing 39.3% total formaldehyde, 31.3% urea and having a formaldehyde to urea mol ratio of 2.5. The mixture is heated to 100° C. in 16 minutes by use of a Glas-Col mantle. After 10 minutes at 100° C. there is added 20 milliliters of 0.5% hydrochloric acid and the pH decreases to 5.0 as determined with a Beckman Model G pH meter on a sample of the charge cooled to room temperature. Heating is continued at 100° C. for 130 minutes during which time the viscosity increases from 50 centipoises to 135 centipoises measured at 25° C. There is then added 3.5 milliliters of 4% sodium hydroxide and the product is cooled to room temperature. The pH is then 7.3 and 0.5 milliliter additional sodium hydroxide is added to adjust the pH to 8.0. After the final pH adjustment, the concentration of combined urea and formaldehyde plus free formaldehyde is 69% and the viscosity is 130 centipoises. On storage at room temperature for four months, the viscosity increases to 235 centipoises and the product remains clear.

EXAMPLE 2

*Typical procedure to body "Arboneeld" B-urea compositions using continuous pH control*

A mixture consisting of five thousand grams of "Arboneeld" B and 1400 grams urea is placed in a 5-liter, 4-neck flask fitted with condenser, stirrer, thermometer and an assembly of high temperature pH electrodes together with a compensating resistance thermometer. The electrodes and the resistance thermometer are connected through a switch box to a continuously indicating Beckman Model R pH meter. The charge is heated to 80° C. in 30 minutes and then maintained at 80° C. for 25 minutes. The pH is held in the range 7.8–8.0 by the addition of 20% sodium hydroxide. At the end of this alkaline heating period the free formaldehyde content is less than 2%. The pH is then adjusted to 5.0 by the addition of 0.5% hydrochloric acid and the heating is continued at 80° C. The charge becomes opalescent in about 5 minutes after the addition of the hydrochloric acid and remains opalescent. After heating at 80° C. for 90 minutes the solution is made alkaline by the addition of 20% sodium hydroxide and cooled to room temperature. The product has a pH of 7.5, the viscosity is 450 centipoises at 25° C. and total formaldehyde plus urea is 70.9%. On storage at room temperature the liquid increases in viscosity and after about four months sets to a gel.

EXAMPLE 3

*Procedure to body a mixture of higher methylolurea and urea (F/U 2)*

One thousand grams of a higher methylol urea containing 50.8% total formaldehyde, 13.0% urea (F/U ratio 7.8) and 378 grams of urea were added to 2-liter, 4-neck flask fitted as described in Example 2. The pH was adjusted to 8 and the mixture was heated to 103° C. After 7 minutes at this temperature the pH was adjusted to 5.35 and heating was continued at 99° C. for 33 minutes. The charge was made alkaline and cooled to room temperature. The product had a UF solids content of 71.2% and F/U ratio 2.0. The viscosity was 450 centipoises, the pH 7.8, and the material was clear.

EXAMPLE 4

*Rate of bodying of "Arboneeld" B-urea (F/U 2.5)*

A mixture of 1000 grams of "Arboneeld" B and 185 grams of urea (F/U 2.5) was heated at pH 7.9 for 10 minutes as described in Example 1. The solution was then adjusted to pH 5.0 with 0.5% hydrochloric acid and heating was continued at 100° C. Samples of the charge were taken periodically for viscosity measurements at 25° C. The rate of increase of viscosity was as follows:

Test 1, in the table presented below, shows what happens when urea is dissolved in "Arboneeld" B and the alkaline solution is allowed to stand at room temperature. Prior to solidification this material is a moderately good adhesive, particularly on the denser woods. On low density woods use of fillers or thickening agents improves the performance of the adhesive.

*Effect of viscosity on stability of bodied "Arboneeld" B-urea (F/U 2)*

| 1. Test number | 1 | 2 | 3 | 4 | 5 | 6 | 7 | 8 |
|---|---|---|---|---|---|---|---|---|
| 2. F/U ratio of charge | 2.0 | 2.0 | 2.0 | 2.0 | 2.0 | 2.0 | 2.0 | 2.0 |
| 3. Methylol-forming step: | | | | | | | | |
| (1) Temp., ° C | | 80 | 80 | 80 | 80 | 80 | 80 | 80 |
| (2) pH | | 8.0 | 8.0 | 8.0 | 8.0 | 8.0 | 8.0 | 8.0 |
| 4. Bodying step: | | | | | | | | |
| (1) pH | | | 5.5 | 5.5 | 5.5 | 5.5 | 5.5 | 5.5 |
| (2) Temp., ° C | | | 80 | 80 | 80 | 80 | 80 | 80 |
| (3) Time, mins | | | 22 | 45 | 90 | 135 | 180 | 290 |
| 5 Product: | | | | | | | | |
| (1) Adjusted | 8.0 | 8.2 | 7.8 | 8.0 | 8.2 | 8.2 | 8.2 | 8.3 |
| (2) Visc., cp. 25° C | 22 | 45 | 75 | 100 | 145 | 200 | 320 | 1,500 |
| (3) Appearance | Clear | Clear | Opaque | Opaque | Opaque | Opaque | Opaque | Opaque |
| 6. Storage properties, room temperature | (1) | (2) | (3) | (4) | (5) | (6) | (7) | (8) |

1 Solidifies in 16–48 hours.
2 Becomes opaque on cooling to 50° C. Forms a thixotropic gel in 16–48 hours.
3 Becomes thixotropic gel within a week.
4 Becomes a thixotropic liquid in 2 weeks.
5 Viscosity increased to 240 cp. in 2 weeks. Ppt. present.
6 Viscosity increased to 250 cp. in 2 weeks. Ppt. present.
7 Viscosity increased to 340 cp. in 2 weeks. Trace of ppt. present corresponding to some commercial products.
8 Viscosity increased to 1800 cp. in 2 weeks. Trace of ppt. present corresponding to some commercial products.

| Minutes at pH 5 and 100° C. | Viscosity, cp., 25° C. |
|---|---|
| 0 | 50 |
| 25 | 80 |
| 50 | 120 |
| 125 | 240 |
| 145 | 340 |
| 175 | 460 |
| 205 | 700 |
| 220 | 850 |
| 245 | 1,070 |
| 350 | 3,600 |
| 400 | gel |

Minutes at pH 3 and 100° C. required to produce gelation, 25.
Minutes at pH 6.9 and 100° C. required to produce gelation, 2,500.

EXAMPLE 5

This example illustrates the effect of the viscosity to which the "Arboneeld" B-urea composition of F/U 2 is bodied on the storage properties of the product. It also illustrates the effect of temperature on the rate of methylol formation. The "Arboneeld" B-urea mixture employed was bodied at 80° C. at a pH of 5.5. The methylol-forming step was continued until the free formaldehyde concentration was less than 3%, and it appeared that the content of free formaldehyde was the equilibrium concentration thereof, since additional heating produced no further change in the analysis for free formaldehyde. The effect of temperature on the time required for the free formaldehyde to decrease to less than 3% during the methylol-forming step at pH 7.6 in reacting "Arboneeld" B-urea of F/U 2.0 is shown below.

| Temperature, ° C. | Time for free formaldehyde to decrease below 3% |
|---|---|
| 35 | 16 hours. |
| 70 | 30 minutes. |
| 110 | <10 minutes. |

Test 2 shows the increase in viscosity on carrying out the methylol-forming step. This product, prior to gel formation, has substantially the same adhesive properties as the unreacted "Arboneeld" B-urea of test 1. As the viscosity increases in the lower range the storage stability improves. At 75 centipoises the material forms a gel within a week (test 3); at 100 centipoises a thixotropic liquid forms in two weeks (test 4); whereas at 145 centipoises and higher viscosities the products do not give rise to these difficulties.

EXAMPLE 6

This example shows the effects of omitting the methylol-forming step before carrying out the acidic or bodying reaction. In test 1 the methylol-forming step was included. A clear product was obtained. In test 2 the methylol-forming step was omitted and an opaque product was formed. On storage at room temperature the opaque product increased in viscosity considerably faster than the clear product.

*Effect of methylol-forming step on stability of viscous "Arboneeld" B-urea compositions*

| 1. Test number | 1 | 2 |
|---|---|---|
| 2. F/U ratio of charge | 2.2 | 2.2 |
| 3. Methylol-forming step: | | |
| (1) Temp., ° C | 90 | |
| (2) pH | 7.4 | |
| 4. Bodying step: | | |
| (1) pH | 5.5 | 5.2 |
| (2) Temp., ° C | 90 | 90 |
| (3) Time, mins | 90 | 70 |
| 5. Product: | | |
| (1) Adjusted pH | 7.0 | 7.0 |
| (2) Visc., cp. 25° C | 300 | 300 |
| (3) Appearance | Clear | Opaque |
| 6. Viscosity on storage at room temperature, cp.: | | |
| (1) 3 months | 700 | 1,000 |
| (2) 5 months | 1,400 | 3,000 |

EXAMPLE 7

The effect of F/U ratio on the bodying rate and on the clarity and stability of the product bodied at 100° C. and pH about 5 is shown in Example 7. The example shows that the higher the F/U ratio, the slower the bodying rate, and the longer the storage life of the product. At F/U 3.5 (test 6) the products are substantially permanently stable, whereas below F/U 2.0 the stability of the product is relatively poor. The example also shows that temperature has a marked effect on the bodying rate and the stability of the product.

*Effect of F/U ratio on rate of bodying of "Arboneeld" B-urea and on clarity and stability of the product*

| 1. Test number | 1 | 2 | 3 | 4 | 5 | 6 |
|---|---|---|---|---|---|---|
| 2. F/U ratio of charge | 1.8 | 2.0 | 2.2 | 2.5 | 3.0 | 3.5 |
| 3. Methylol-forming step: | | | | | | |
| (1) Temp., °C | 100 | 100 | 100 | 100 | 100 | 100 |
| (2) pH | 8.1 | 7.9 | 7.9 | 8.0 | 7.9 | 7.8 |
| 4. Bodying step: | | | | | | |
| (1) pH | 5.3 | 5.3 | 5.2 | 5.0 | 4.7 | 4.5 |
| (2) Temp., °C | 100 | 100 | 100 | 100 | 100 | 100 |
| (3) Time, mins | 15 | 120 | 127 | 128 | 135 | 130 |
| 5. Product: | | | | | | |
| (1) Adjusted pH | 8.1 | 7.8 | 7.6 | 8.1 | 8.0 | 8.0 |
| (2) Visc., cp. 25° C | 330 | 1,100 | 275 | 130 | 70 | 40 |
| (3) Appearance | Opaque | Clear | Clear | Clear | Clear | Clear |
| 6. Storage properties, r. t | (1) | (2) | (3) | (4) | (5) | (6) |

[1] Viscosity increased to 380 cp. in 2 weeks. A slight ppt. formed. Used to prepare adhesive, Test 1, Example 12.
[2] A clear gel formed in 3 months.
[3] Viscosity increased to 700 cp. in 4 months. Product clear.
[4] Viscosity increased to 235 cp. in 4 months. Product clear.
[5] Viscosity increased to 110 cp. in 4 months. Product clear.
[6] Viscosity increased to 60 cp. in 4 months. Product clear.

EXAMPLE 8

The effect of bodying temperature on the properties of viscous "Arboneeld" B-urea compositions is shown in the following table.

*Effect of bodying temperature on properties of viscous "Arboneeld" B-urea compositions*

| 1. Test number | 1 | 2 | 3 | 4 |
|---|---|---|---|---|
| 2. F/U ratio of charge | 2.5 | 2.5 | 2.5 | 2.5 |
| 3. Methylol-forming step: | | | | |
| (1) Temp., °C | 65 | 75 | 90 | 100 |
| (2) pH | 7.4 | 7.1 | 7.0 | 7.9 |
| 4. Bodying step: | | | | |
| (1) pH | 5.1 | 5.1 | 5.1 | 5.0 |
| (2) Temp., °C | 65 | 75 | 90 | 100 |
| (3) Time, mins | 420 | 120 | 165 | 70 |
| 5. Product: | | | | |
| (1) Adjusted pH | 8.1 | 7.5 | 7.8 | 7.9 |
| (2) Visc., cp. 25° C | 85 | 100 | 190 | 130 |
| (3) Appearance | Opalescent | Clear | Clear | Clear |
| 6. Storage properties, r. t | (1) | (2) | (3) | (4) |

[1] A precipitate formed in 3 days.
[2] A precipitate formed in 3 days.
[3] Viscosity increased to 385 cp. in 4 months. Product clear.
[4] Viscosity increased to 175 cp. in 1 month. Product clear. Used to prepare adhesive, Test 2, Example 12.

EXAMPLE 9

*Effect of pH on rate of bodying of "Arboneeld" B-urea (F/U 2)*

| 1. Test number | 1 | 2 | 3 | 4 | 5 | 6 |
|---|---|---|---|---|---|---|
| 2. F/U ratio of charge | 2.0 | 2.0 | 2.0 | 2.0 | 2.0 | 2.0 |
| 3. Methylol-forming step: | | | | | | |
| (1) Temp., °C | 80 | 80 | 80 | 80 | 80 | 80 |
| (2) pH | 7.8 | 8.2 | 8.0 | 8.0 | 8.0 | 8.7 |
| 4. Bodying step: | | | | | | |
| (1) pH | 4.5 | 5.0 | 5.5 | 6.1 | 6.35 | 6.5 |
| (2) Temp., °C | 82 | 82 | 80 | 80 | 80 | 80 |
| (3) Time, mins, ca | 15 | 50 | 135 | 350 | 610 | 240 |
| 5. Product: | | | | | | |
| (1) Adjusted pH | 8.1 | 7.5 | 8.2 | 8.2 | 7.6 | 7.6 |
| (2) Visc., cp. 25° C | 200 | 200 | 200 | 200 | 200 | 200 |
| (3) Appearance | Opaque | Opaque | Opaque | Opaque | Opaque | Opaque |
| 6. Storage properties, r. t | | | (1) | (2) | (3) | (4) |

[1] Trace of ppt. formed in 2 weeks. Similar to some commercial products.
[2] Slight amount of ppt. formed in 2 weeks.
[3] Large amount of ppt. formed in 2 weeks.
[4] Set to a thixotropic gel in 1 day.

EXAMPLE 10

*Effect of temperature on the stability of bodied "Arboneeld" B-urea (F/U 2.2)*

The material described in test 3, Example 7, was stored at 20°–25° C. for three months (pH 7.6) at which time the viscosity was 570 centipoises. A portion of the product was then stored at 50° C. The changes in viscosities of the two samples were as follows:

| Storage temperature | 20°–25° C. | 50° C. |
|---|---|---|
| | Viscosity, cp. 25° C. | |
| Time: | | |
| 0 | 570 | 570 |
| 2 days | | 600 |
| 3 days | | 695 |
| 4 days | | 760 |
| 1 week | 575 | |
| 5 weeks | 630 | |

EXAMPLE 11

A sample of "Arboneeld" B-urea (F/U 2.5) was bodied to 175 centipoises using the procedure of Example 2. Portions of this sample were then adjusted to different pH levels and stored at room temperature. The storage properties are given below:

| Storage pH | Storage properties at room temperature |
|---|---|
| 4.0 | Gelled in 1 week. |
| 5.0 | Gelled in 2 weeks. |
| 6.0 | 275 cp. in 1 month. |
| 7.0 | 200 cp. in 1 month. |
| 8.0 | 205 cp. in 1 month. |
| 9.0 | 240 cp. in 1 month. |

EXAMPLE 12

*Adhesives from viscous "Arboneeld" B-urea compositions*

*Test 1.*—The product for test 1, Example 7 (aged one week; viscosity about 330 centipoises; opaque; F/U 1.8), was used to prepare an adhesive. To 100 grams of the intermediate there was added 20 grams of walnut shell flour filler and 0.7 gram of ammonium chloride catalyst. This was then applied within 5 minutes to both sides of a ⅛ x 12/12″ dry Douglas fir veneer by means of a brush. The application rate was 85 pounds of liquid glue per 1000 sq. ft. of single glue line. A plywood bundle was then formed by placing the core between two Duglas fir veneers. After standing 5 minutes the assembly was pressed at 135° C. and 150 p. s. i. for 15 minutes. The pot life of the adhesive at room temperature was 55 minutes. Plywood shear-strength specimens from the panel were tested dry, and the break occurred within the wood rather than in the adhesive bond; specimens were boiled in water for 4 hours and 6 of the 10 specimens delaminated. In a similar test with a urea-formalin mixture (F/U 2.0) steam blisters developed and a poor bond was obtained, due to the relatively low solids content. The content of total solids was increased by adding wheat flour, and this avoided the blisters but produced a poor bond. When the solids content was increased by vacuum distillation of water good bond strength was obtained with dry specimens, and in the boiling water test 8 of 10 specimens delaminated.

*Test 2.*—An adhesive was prepared from the product of test 4, Example 8 by adding 7.8 grams of urea to 100 grams of the composition having an F/U of 2.5 to obtain F/U 2.0, and allowing the mixture to stand overnight. There was then added 20 grams of walnut shell flour and 0.7 gram of ammonium chloride. A Douglas fir plywood panel was prepared as described in test 1 and shear specimens were boiled in water for 4 hours. None of the 10 specimens delaminated. The pot life of this adhesive was 70 minutes.

*Test 3.*—A clear "Arboneeld" B-urea composition having an F/U ratio of 2.5 and a viscosity of 120 centipoises was used to prepare an F/U 2 adhesive as described in test 2 except that the catalyst was added at the same time as the urea. In this case also there was no delamination of the shear specimens on exposure to boiling water for 4 hours. The pot life of the adhesive was 145 minutes.

*Test 4.*—Test 3 was repeated except that the mixture of F/U 2.5 and urea was heated at 85° C. for 20 minutes and cooled to room temperature before adding the catalyst. There was no delamination in the boiling water test. Pot life of this adhesive was 105 minutes.

*Test 5.*—An adhesive was prepared from an opaque "Arboneeld" B-urea composition having an F/U ratio of 2.0 and a viscosity of 450 centipoises. To 100 grams of the base there was added 20 grams of walnut shell flour and 0.7 gram of ammonium chloride catalyst. This was spread at the rate of 79 pounds of liquid adhesive per 1000 sq. ft. of single glue line in preparing a three ply 12″ x 12″ panel from 1/16″ birch veneer. The panel was pressed at 135° C. and 150 p. s. i. for 20 minutes. Shear specimens were then boiled in water for 4 hours and there were no delaminations.

The above examples serve to illustrate the invention and to point out certain of the advantages thereof.

The viscous "Arboneeld" B-urea compositions obtained as above described are suitable for use in all applications where standard viscous urea-formaldehyde liquids are employed. The results obtained with these compositions as plywood adhesives are quite similar to the results obtained with the best previously known urea-formaldehyde adhesives. In Example 12, test 1 shows the results using an opaque composition of F/U 1.8 on Douglas fir, and test 5 of Example 12 shows the use of an opaque composition of F/U 2.0 with birch. Tests 2, 3 and 4 of the sample example show three procedures for preparing adhesives from clear, bodied compositions of F/U 2.5. In test 2 the mixture was allowed to stand overnight at room temperature to react the urea and free formaldehyde. In test 3 the mix was used without first reacting the added urea in a separate step. In test 4 the F/U 2.5 urea composition was heated with urea at 85° C. for 20 minutes to carry out a methylol-forming step. Adhesive results by these three routes for converting F/U 2.5 to F/U 2 were all excellent.

From the foregoing specification it is apparent that by using excess formaldehyde in uncombined form with higher methylol ureas, and thereafter bodying the mixture as described herein, the storage life of the adhesive is greatly increased and a simple method for preparing a high quality adhesive is provided. One of the surprising features of the invention is that despite the stabilization which is effected through the use of polymethylol ureas and controlled amounts of free formaldehyde the steps of preparing a satisfactory bodied adhesive from the permanently stable composition are not unduly difficult or complex.

I claim:

1. A process for preparing a urea-formaldehyde partially polymerized liquid composition which comprises adding urea to a clear, liquid, aqueous polymethylol urea composition having a total free and combined formaldehyde : urea ratio of 4:1 to 6:1, a mol ratio of combined to free formaldehyde within the range of 1:1 to 3:1, and having a urea-formaldehyde content including the free and combined urea and formaldehyde in the range of 60% to 75%, at a pH of 3.0 to 9.5, until the total free and combined formaldehyde : urea mol ratio is in the range of 1.8:1 to 3:1, maintaining the resulting mixture at the said pH at a temperature of 25° to 110° C., said temperature being however not in excess of 80° C. when the pH is below 5.0 until the free formaldehyde concentration decreases to a constant equilibrium value, and thereafter heating the mixture at a pH in the range of 3.0 to 6.9 at a temperature in the range of 60° to 110° C., said temperature being however not less than 90° C. when the pH is within the range of 6.5 to 6.9, until its viscosity is within the range of 40 to 3600 centipoises.

2. A process for preparing a urea-formaldehyde partially polymerized liquid composition which comprises adding urea to a clear, liquid, aqueous polymethylol urea composition having a total free and combined formaldehyde : urea mol ratio of 4:1 to 6:1, a mol ratio of combined to free formaldehyde within the range of 1:1 to 3:1, and having a urea-formaldehyde content including the free and combined urea and formaldehyde in the range of 60% to 75%, at a pH of 3.0 to 9.5, until the total free and combined formaldehyde : urea mol ratio is in the range of 1.8:1 to 2:1, maintaining the resulting mixture at the said pH at a temperature of 25° to 110° C., said temperature being however not in excess of 80° C. when the pH is below 5.0, until the free formaldehyde concentration decreases to below 3% of the weight of the composition, and thereafter heating the mixture at a pH in the range of 3.0 to 6.9 at a temperature in the range of 60° to 110° C., said temperature being however not less than 90° C. when the pH is within the range of 6.5 to 6.9 until its viscosity is within the range of 40 to 3600 centipoises, and thereafter adjusting the pH of the resulting mixture to a value within the range of 7.0 to 9.0.

3. In a process for preparing a urea-formaldehyde partially polymerized liquid composition which remains clear on standing at 25° C. for at least six months, the steps which comprise adding urea to a clear liquid aqueous composition consisting essentially of 45% by weight of trimethylolurea, 20% free formaldehyde and 35% water, in sufficient quantity to produce a total formaldehyde : urea mol ratio of 2.5:1 to 2.2:1, subjecting the resulting mixture to a methylolation reaction by heating at a pH of 7 to 9 until the free formaldehyde content decreases to a level between 4% and 6% of the weight of the mixture, said heating being at a temperature within the range of 55° to 100° C., said methylolation reaction being thus continued until the resulting mixture, upon adjustment of the pH to a value within the range of 4.5–5.0 and heating at a temperature within the range of 70° to 95° C. until the viscosity reaches 100 to 1000 centipoises, remains clear on standing at 25° C. for a period of at least 6 months at a pH of 7 to 9.

4. A clear liquid partially polymerized methylol-urea composition having a pH of 7 to 9, a viscosity of 100 to 1000 centipoises, a total formaldehyde : urea mol ratio of 2.2 to 2.5, a urea-formaldehyde content of 65 to 75%, a free formaldehyde content of 2 to 6%, the remainder of the mixture consisting substantially entirely of water, said composition being further characterized in that it remains clear on storage for a period of over 6 months.

HAMLINE MONROE KVALNES.

No references cited.